United States Patent
Bethers et al.

(10) Patent No.: US 10,313,241 B2
(45) Date of Patent: Jun. 4, 2019

(54) SYSTEMS AND METHODS FOR ROUTING INTERNET PACKETS BETWEEN ENTERPRISE NETWORK SITES

(71) Applicant: Cox Communications, Inc., Atlanta, GA (US)

(72) Inventors: Joel Bethers, Atlanta, GA (US); Michael Eggert, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 281 days.

(21) Appl. No.: 15/083,003

(22) Filed: Mar. 28, 2016

(65) Prior Publication Data

US 2017/0279717 A1    Sep. 28, 2017

(51) Int. Cl.
*H04L 12/745* (2013.01)
*H04L 29/06* (2006.01)

(52) U.S. Cl.
CPC ........ *H04L 45/748* (2013.01); *H04L 63/0236* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 2006/0268681 | A1* | 11/2006 | Raza | H04L 45/02 370/216 |
| 2008/0062891 | A1* | 3/2008 | Van Der Merwe | H04L 45/04 370/254 |
| 2012/0213218 | A1* | 8/2012 | Yilmaz | H04L 45/02 370/351 |

* cited by examiner

*Primary Examiner* — Fatoumata Traore
(74) *Attorney, Agent, or Firm* — Eversheds Sutherland (US) LLP

(57) ABSTRACT

This disclosure describes methods, devices, and systems related to routing packets over enterprise network sites. A method may be disclosed for routing packets between hosts at a first site and hosts at a second site in a network using a firewall. The method may comprise receiving a request, in a first packet, from a first router to send one or more packets to two or more hosts at the second site. The method may comprise receiving a first sub-network prefix, in a route advertisement, corresponding to two or more hosts at the first site from the first router, and receiving a first community value, in a first advertisement, associated with the first sub-network prefix. The method may comprise generating a first local preference value based at least in part on the first community value. And the method may comprise sending the request, first sub-network prefix, and first local preference value to a second router, in a second advertisement.

18 Claims, 14 Drawing Sheets

| Router/Firewall Name | Address | Sub-network Prefix | Next Hop | Community Value | Local Preference Value |
|---|---|---|---|---|---|
| PE router 201 | 2.1.0.0 | 2.0.0.0/8 | 2.1.0.0 | $CV_{11}, ..., CV_{1N}$ | $LV_{11}, ..., LV_{1M}$ |
| FW 221 | 2.21.0.0 | 2.0.0.0/8 | 2.21.0.0 | $CV_{21}, ..., CV_{2N}$ | $LV_{21}, ..., LV_{2M}$ |
| FW 231 | 2.31.0.0 | 2.0.0.0/8 | 2.31.0.0 | $CV_{31}, ..., CV_{3N}$ | $LV_{31}, ..., LV_{3M}$ |
| PE router 301 | 3.1.0.0 | 3.0.0.0/8 | 8.0.0.1 | $CV_{41}, ..., CV_{4N}$ | $LV_{41}, ..., LV_{4M}$ |
| FW 321 | 3.21.0.0 | 3.0.0.0/8 | 8.0.0.1 | $CV_{51}, ..., CV_{5N}$ | $LV_{51}, ..., LV_{5M}$ |
| FW 331 | 3.31.0.0 | 3.0.0.0/8 | 8.0.0.1 | $CV_{61}, ..., CV_{6N}$ | $LV_{61}, ..., LV_{6M}$ |
| ... | ... | ... | ... | ... | ... |

| Host Name 791 | Address 792 | Sub-network Prefix 793 | Next Hop 794 | Community Value 795 | Local Preference Value 796 | Label 797 |
|---|---|---|---|---|---|---|
| Host 415 | 4.1.19.15 | 4.1.19.0/24 | 8.0.0.1 | $CV_1$ | $LV_1$ | $L_1$ |
| Host 505 | 5.1.11.5 | 5.1.11.0/24 | 8.0.0.1 | $CV_2$ | $LV_2$ | $L_2$ |
| Host 625 | 6.1.19.25 | 6.1.19.0/24 | 8.0.0.1 | $CV_3$ | $LV_3$ | $L_3$ |
| Host 605 | 6.1.11.5 | 6.1.11.0/24 | 8.0.0.1 | $CV_4$ | $LV_4$ | $L_4$ |
| Host 705 | 7.1.11.5 | 7.1.11.0/24 | 8.0.0.1 | $CV_5$ | $LV_5$ | $L_5$ |
| Host 315 | 3.1.11.15 | 3.1.11.0/24 | 8.0.0.1 | $CV_6$ | $LV_6$ | $L_6$ |
| Host 325 | 3.1.19.25 | 3.1.19.0/24 | 8.0.0.1 | $CV_7$ | $LV_7$ | $L_7$ |
| Host 335 | 3.1.19.35 | 3.1.19.0/24 | 8.0.0.1 | $CV_8$ | $LV_8$ | $L_8$ |

SYSTEMS AND METHODS FOR ROUTING INTERNET PACKETS BETWEEN ENTERPRISE NETWORK SITES

BACKGROUND

Most Internet Service Providers (ISPs) providing cable, telecommunication, and Internet services to commercial and enterprise customers in different locations across a large geographic area (e.g., a continent) use a variety of security measures to ensure that Internet packets used to provide these services are not disrupted as they traverse the ISP's Internet backbone. The ISP's Internet backbone typically comprises one or more autonomous systems (ASs) that are connected using one or more routers and switches placed throughout the geographic area where the ISP provides service to its customers. The ASs provide service to different regions (i.e., sites) of the geographic area by routing packets between devices connected to the different ASs. In many instances, an ISP may assign one or more devices within the same AS or across different ASs to a virtual private network (VPN). For example, an ISP may assign all devices (e.g., computers, mobile devices, and/or servers) used within a company to a VPN so that Internet packets traveling between these devices are not routed through the ISP's Internet backbone along with customer Internet packets. The VPN may be assigned one or more private (i.e., only accessible to the company) Internet connections between one or more routers and switches that may be used to connect the company devices. When a company device (e.g., laptop computer) in the VPN wants to access another device (e.g., server hosting a database) in the VPN, the one or more routers and switches may route one or more packets from the laptop computer to the server to access the database. Similarly the router may route one or more packets generated by the database on the server to the laptop computer. However, when the laptop attempts to access another device (e.g., server hosting a website) that is not assigned to the same VPN, the one or more routers and switches oftentimes route the one or more packets received from the laptop through a pair of firewalls (i.e., firewall pair) which in turn forwards the packet to the server hosting the website. The one or more packets are routed through the firewall pair to filter (i.e., prevent) unsolicited access to the devices in the VPN. For example, if the server hosting the website sends one or more packets to the firewall pair, and the laptop did not request the packets, the firewall pair will not forward the packets to the laptop.

Because an ISP's Internet backbone may cover a large geographic area, there may be a firewall pair at each site. Currently, firewall pairs are used to filter packets from one or more devices in one VPN destined for one or more devices in another VPN or one or more devices connected to the Internet that do not belong to a VPN. However, existing implementations of autonomous systems that employ firewall pairs, routers, and switches do not perform adequately when a firewall pair at a first site does not work properly. Consequently, when a firewall pair at a first site does not work properly, some packets that are routed through the firewall pair from devices in one VPN to devices that are not in the VPN may not be delivered. When this happens, none of the devices on either side of the VPN are able to communicate with one another. As a result, users of the devices may be without access to the Internet, phone or video services, and/or other multimedia services.

BRIEF DESCRIPTION OF THE FIGURES

Reference will now be made to the accompanying drawings, which are not necessarily drawn to scale, and wherein:

FIG. 4 is an illustrative routing table used by the exemplary routers disclosed herein, in accordance with example embodiments of the disclosure.

FIG. 5 is an illustrative routing table used by the exemplary routers disclosed herein, in accordance with example embodiments of the disclosure.

FIG. 6 is an illustrative routing table used by the exemplary routers disclosed herein, in accordance with example embodiments of the disclosure.

FIG. 7 is an illustrative routing table used by the exemplary firewall pairs disclosed herein, in accordance with example embodiments of the disclosure.

DETAILED DESCRIPTION OF EMBODIMENTS OF THE DISCLOSURE

Figure 1:
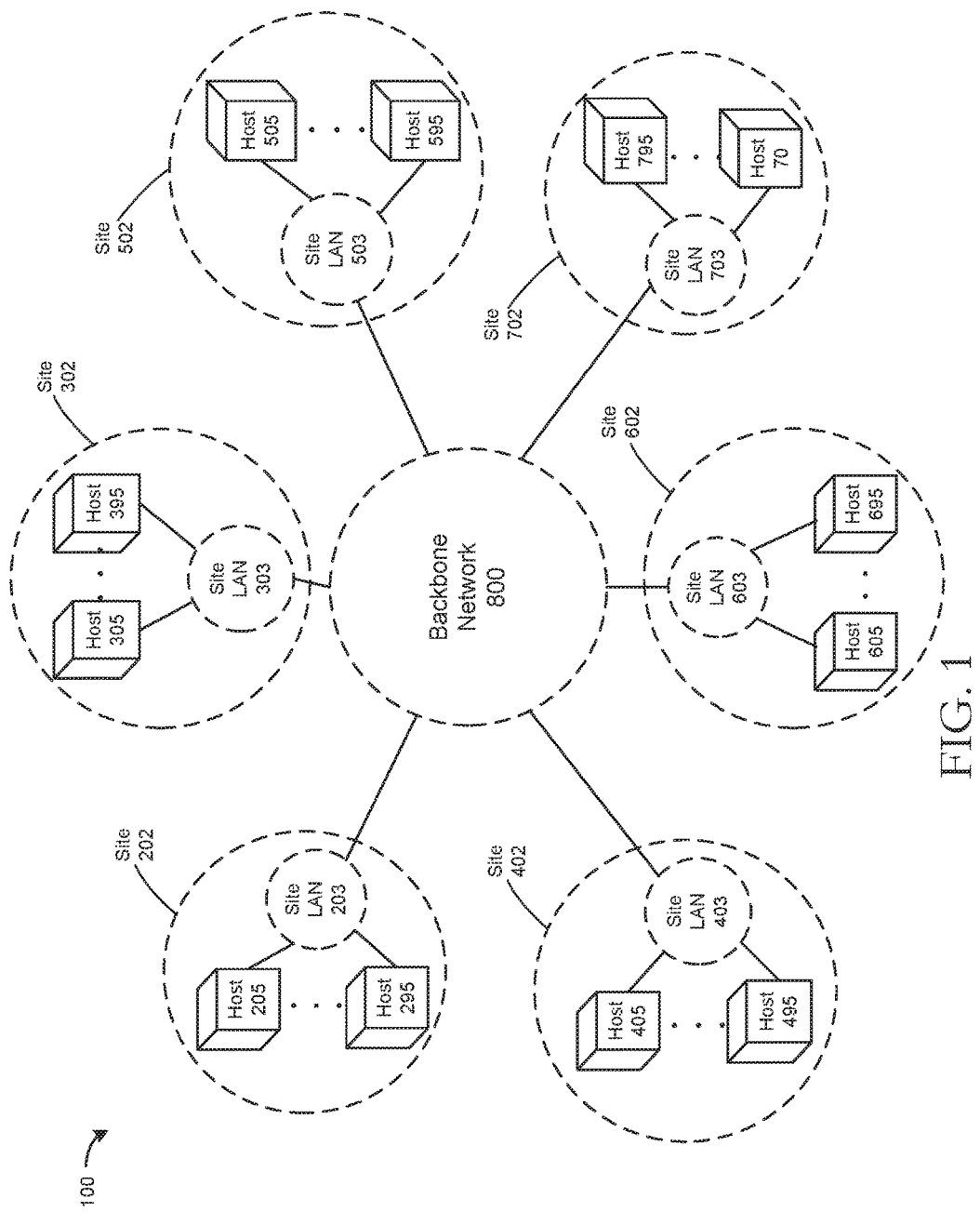
FIG. 1 is an illustrative example logical network diagram, in accordance with example embodiments of the disclosure.

The disclosure describes embodiments more fully hereinafter with reference to the accompanying drawings, in which example embodiments are disclosed. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Example embodiments of the disclosure may provide systems and methods for establishing symmetric traffic patterns between one or more hosts at different ISP sites by leveraging the routing capabilities of firewall pairs at the different sites, and the ability to assign specific values to one or more parameters associated with the routing capabilities of the firewall pairs. Example embodiments may include a firewall pair at each site, wherein one side (e.g., interface) of the firewall pair is directly connected to an interface of one or more provider edge (PE) routers, and the other interface of the firewall pair is connected to an interface on one or more PE routers in a virtual private network (VPN). In example embodiments, the PE routers may have one or more other interfaces connected to one or more interfaces on customer edge (CE) routers that are connected to one or more hosts. Example embodiments may include PE routers containing interfaces that may connect to one or more interfaces on a P router.

The one or more PE routers and the firewall pair may contain one or more routing tables that may be used to route packets from hosts at the site to hosts at the same site or hosts at other sites that are connected to other PE routers at other sites. The PE routers and the firewall pairs at each site may maintain one or more routing tables to route the packet from one host to another. In example embodiments, the routing tables may be organized based on the grouping of hosts into certain networks. The one or more hosts at a site may all be assigned to one network, or one or more of the hosts at the site may be assigned to a first network and the one or more other remaining hosts at the site may be assigned to a second network. In the second scenario, the one or more PE routers and the firewall pair at the site may store one routing table for the one or more hosts at the site assigned to the first network and another routing table for the one or more hosts at the site assigned to the second network. Therefore all hosts at a site may or may not be assigned to the same network.

The one or more PE routers, CE routers, and hosts at a site may send and receive packets to one another using one or more application layer protocols. Example embodiments disclosed herein may use an application layer protocol (e.g., Border Gateway Protocol (BGP)) to advertise routes between the PE routers and the CE routers at a site and to establish and maintain a connection between the PE routers at different sites, and the firewall pairs at the sites. A full BGP mesh may be established between each PE router at a site and the firewall pairs at all of the ISP sites. One or more Interior Gateway Protocols (IGPs) may be used to create and/or maintain sessions between each PE router and the firewall pairs at the ISP sites over the full BGP mesh. For example, in some embodiments, an Open Shortest Path First (OSPF) IGP may be used, or any other distance vector routing protocol may be used, to establish and maintain sessions between the PE routers and the firewall pairs. In other embodiments, an Intermediate System to Intermediate System (IS-IS) IGP may be used to establish and maintain the sessions between the PE routers and firewall pairs. Each session may include Network Layer Reachability Information (NLRI) which may be used by the PE routers to identify the next hop (i.e., the next PE router) a packet should be sent to. The NLRI may be used by a PE router to determine which interface to use to forward a packet so that it is sent to the next correct PE router.

The one or more PE routers at a site may use one or more tunneling protocols to route packets to firewall pairs and/or PE routers at other sites. Example embodiments disclosed herein may use a Generic Routing Encapsulation (GRE) protocol, Layer 2 Tunneling Protocol (L2TP), Secure Shell, and/or Multiprotocol Label Switching (MPLS). The one or more tunneling protocols may also be used to route packets between different PE routers storing routing tables containing one or more hosts assigned to the same network.

Example embodiments may include a network of P routers (e.g., PRs 801, 803, 805, 807, 809, 811, and 813 in FIG. 2G) which may be used to connect the PE routers and the firewall pairs at different sites to one another. The P routers may also use a tunnel protocol to route packets between sites. The BGP full mesh may be established over the network of P routers. Each PE router and firewall pair may serve as an ingress point and/or egress point for the tunneling protocol and the P routers may be routers that serve as a dedicated path between a PE router at a first site and a firewall pair at another site.

The firewall pairs at the ISP sites may contain one or more parameters that may be sent (e.g., advertised) to each PE router, and may be used by the PE routers to route traffic to certain firewall pairs at certain ISP sites. One of the parameters stored on a firewall pair may be a first numerical value corresponding to a sub-network prefix received from a first PE router advertising the sub-network prefix, to the firewall pair, associated with one or more hosts on a first network requesting access to one or more hosts on a second network through the firewall pair. The firewall pairs at different sites each may receive the first numerical value, but may generate different second numerical values based at least in part on the first numerical value. Each firewall pair may send their corresponding second numerical value to a second PE router connected to the one or more hosts on the second network. The second PE router may order the firewall pairs, in ascending order, in a routing table according to the second numerical values. The second PE router may select the firewall pair with the greatest second numerical value to route the response from the one or more hosts on the second network to the one or more hosts on the first network requesting access to the one or more hosts on the second network. The second firewall pair may route the response to the P router closest to the second firewall pair, which may route the response over the network of P routers to the P router closest to the first PE router. The first PE router may then route the response to the one or more hosts on the first network using the one or more CE routers at the site.

Example embodiments may include a first and second group of hosts that exchange packets and are collocated at the same ISP site, but are assigned to two different networks. In this scenario, as well as other scenarios in which two groups of hosts are assigned to two different networks, the PE router at the site may receive one or more packets from either group of hosts and may send the one or more packets, out a first interface, to a first interface on a firewall pair at the ISP site, which may in turn send the one or more packets, out a second interface, to a second interface on the PE router, which may in turn forward the one or more packets, out a third interface, to an interface on the CE routers which may forward the one or more packets to the hosts in the other group. If the firewall pair at the ISP site should fail or be disabled for administrative reasons, the PE router may route the one or more packets out an interface connected to a P router which may in turn forward the one or more packets to a firewall pair at another site, using the network of P routers, which may in turn route the one or more packets back to the PE router across the network of P routers. The PE router may then route the packets out to the intended hosts in the other group out an interface connected to the CE routers.

Alternatively, the PE router may route the packets between the two groups of hosts by sending the one or more packets from one group of hosts out an interface connected to an interface on a P router in the network of P routers. The interface that the PE router sends the one or more packets out may be an interface that provides one or more tunneling protocols. The P router may in turn send the one or more packets out an interface, providing one or more tunneling protocols, that is connected to an interface on the firewall pair at the site providing one or more tunneling protocols. The firewall pair may in turn route the one or more packets out another interface to a first interface on the PE router at the site using an application layer routing protocol (e.g., BGP) or link layer protocol (e.g., Open Shortest Path First). After the PE router receives the one or more packets through the first interface on the PE router, the PE router may in turn route the one or more packets to a first interface on the CE routers, using an application layer routing protocol or link layer protocol, which may in turn forward the one or more packets to the intended hosts on the other network out a second interface. As described above, if the firewall pair at the site should fail or be disabled for administrative reasons, the PE router may route the one or more packets out an interface to the P router and the PE router may route the one or more packets across the network of P routers to another firewall pair which may in turn route the packets back to the PE router for distribution to the one or more hosts in the other group.

Example embodiments may include methods of routing packets from one or more hosts that are not collocated at an ISP site, to one or more hosts that are collocated at a site. The one or more hosts that are not collocated at the ISP site may be assigned to a network that is included in a routing table stored on a PE router that is geographically closest to the one or more hosts that are not collocated at the ISP site. Therefore all packets exchanged between one or more hosts on another network and the one or more hosts that are not collocated at the ISP site may traverse a firewall pair collocated at the ISP site. The one or more hosts that are not collocated at the ISP site may also be assigned to a network based at least in part on the type of hosts attempting to access one or more hosts that are collocated at a site. If the one or more hosts are associated with an organization that operates an enterprise network spanning a large geographic region (e.g., continent of Asia), the one or more hosts not collocated at the ISP site may be assigned to a network associated with the enterprise network. The PE router may assign the one or more hosts that are not collocated at the ISP site to a network such that packets sent from the one or more hosts that are not collocated at the ISP site are routed by the PE router to a firewall pair that is collocated at the ISP site.

Some example elements involved in the operation of the systems, methods, and apparatuses disclosed herein may be better understood with reference to the figures. FIG. 1 is an illustrative example logical network diagram, in accordance with example embodiments of the disclosure. FIG. 1 depicts a number of ISP sites (e.g., the Sites 202-702) each of which comprises a Local Area Network (LAN) (e.g., the Site LANs 203-703), each of which has one or more hosts (e.g., the Hosts 205-295, the Hosts 305-395, the Hosts 405-495, the Hosts 505-595, the Hosts 605-695, the Hosts 705-795) connected to it, and an enterprise backbone network (e.g., the backbone network 800) connecting all of the sites. FIG. 1 illustrates a logical connection between the one or more sites as a full mesh, wherein the hosts at any site may access any other host at any other site. For example, the Host 295 may be the laptop computer from the examples above, and may request a webpage hosted on a server (e.g., the Host 505). If the Hosts 295 and 505 are assigned to the same network (e.g., VPN), then one or more packets (e.g., traffic) may be sent between the Sites 202 and 502 without the traffic traversing a firewall pair at either site. If, however, the Host 295 is assigned to one VPN and the Host 505 is assigned to another VPN or not assigned to a VPN at all, the traffic between the two hosts may traverse a firewall pair (not shown) located at the Site 202, the Site 502, or a firewall pair at each site. The process of choosing which firewall pair the traffic will traverse may be based at least in part on one or more parameters (e.g., a community value and local preference value) received, stored, and used by the firewall pairs and one or more PE routers (not shown) within the Site LAN 203 and the Site LAN 503 to route traffic between the Hosts 295 and 505.

FIGS. 2A-2G are exemplary enterprise network environments, illustrating one or more network devices that may be used to route and switch packets as they traverse the exemplary network environment from one host to another. In the enterprise network environment 200 may comprise a number of ISP sites, each of which comprises one or more hosts, one or more CE routers, a PE router, and a firewall pair. The ISP sites may be connected in a full mesh orientation using an enterprise backbone network (e.g., the backbone network 800) as described above with reference to FIG. 1. The Hosts 205-295, and the other hosts in the enterprise network environment 200, may generally execute application programs, stored on one or more computer-readable media within the host, on behalf of one or more user(s), by employing network and/or Internet communication services in support of executing the applications. The Hosts 205-295 may span a wide range of sizes, speeds, and functions. They may range in size from small microprocessors to workstations, and from mainframes to supercomputers. In function, they may range from single-purpose hosts (such as terminal servers) to full-service hosts that support a variety of online network services, including but not limited to remote login features, file transfer, and electronic mail. The Hosts 205-295 may be multihomed (e.g., it has more than one interface to one or more different networks). A first host may perform one or more different functions and/or operations when executing the same application programs stored on a second host. For example, one or more of the Hosts 205-295 may contain one or more application programs that may provide landline Internet Protocol (IP) phone services (e.g., voice and messaging services) to one or more user devices (e.g., an IP phone handset) thereby enabling a user of the IP phone handset to place a phone call or send a message to another phone handset (e.g., an IP phone handset, a mobile phone handset, etc.) without any restrictions on the calls the user may make. For instance, a user of an IP phone handset connected to the Host 205 may be able to place phone calls to a mobile phone handset in another country without entering an access code. Whereas a user of an IP phone handset connected to the Host 595 may not be able to place phone calls to a phone handset in another country without entering an access code. The Hosts 305-395, 405-495, 505-595, 605-695, and 705-795 may perform one or more of the same functions and/or operations as the Hosts 205-295 and may be microprocessors, workstations, mainframe computers, and/or supercomputers as described above with reference to the Hosts 205-295. The Hosts 305-395, 405-495, 505-595, 605-695, and 705-795 may also perform one or more other functions and/or operations that are not the same as the functions and/or operations executed by the Hosts 205-295.

Enterprise network environment 200 may also comprise one or more CE routers (e.g., the CE routers 211-219, the CE routers 311-319, the CE routers 411-419, the CE routers 511-519, the CE routers 611-619, and the CE routers 711-719) connecting the hosts at the respective sites to the PE router at each of the respective sites. For example, the CE routers 211-219 connects the Hosts 205-295 to the PE router 201 and may route traffic from the Hosts 205-295 to the PE router 201 and vice versa. In some embodiments, a full mesh may be formed between each of the Hosts 205-295 and each of the CE routers 211-219. In other embodiments, the connection between each of the Hosts 205-295 and each of the CE routers 211-219 may not be limited to a full mesh. In some embodiments, a connection may be formed between each of the Hosts 205-295 and each of the CE routers 211-219 such that a graph does not form a full mesh. The CE routers may have a plurality of interfaces, one or more of which is/are connected to an interface on one or more hosts and one or more interfaces connected to one or more interfaces on the PE router at a site. Traffic routed between the interfaces connecting the CE routers and the one or more hosts is routed between the CE routers and the one or more hosts using an Internet Protocol (IP) addressing format. The routing protocol used to route packets between the two interfaces may be an Open Shortest Path First (OSPF) routing protocol. The CE routers and PE routers may exchange routes. For example, the CE routers may send the PE router routes to one or more hosts so that the PE router knows which interface to route traffic out so that it reaches the intended host. For instance, the PE router may have an interface for each CE router, and may have in some instances more than one interface that may be connected to a single interface on each CE router. When a PE router receives traffic from a backbone network device destined for a host connected to a CE router the PE router is connected to, the PE router may use the route it received from the CE router to forward the traffic out the interface connected to the interface on the CE router. In some embodiments, when the CE routers send routes to the PE router for one or more hosts connected to the CE routers, the PE router may add the routes to a Virtual Routing Forwarding (VRF) table (e.g., Forwarding Information Base (FIB)) corresponding to a VPN that the one or more hosts are assigned to. In some embodiments, the PE router may send routes to the CE routers for one or more hosts assigned to the same or different VPNs so that the CE routers know which interface to route traffic out so that it is received on the correct interface on the PE router. The CE routers 211-219, the CE routers 311-319, the CE routers 411-419, the CE routers 511-519, the CE routers 611-619, and the CE routers 711-719 may perform one or more of the same functions described above with regard to the connection between the exemplary CE router and PE router. The CE routers 211-219, the CE routers 311-319, the CE routers 411-419, the CE routers 511-519, the CE routers 611-619, and the CE routers 711-719 may also perform one or more other functions and/or operations that are not the same as the functions and/or operations described above regarding the connection between the exemplary CE router and PE router.

At each site there may be a PE router that may connect the one or more CE routers, firewall pairs, and a P router in the enterprise backbone network. For example, the PE router 201 may be a provider edge router capable of routing packets between the CE routers 211-219, the firewalls 221 and 231 (the firewall pair 241), and a P router (e.g., the PR 801) using one or more routing protocols. For instance, the PE router 201 in FIG. 2A may have one or more interfaces some of which may be capable of routing packets using the BGP routing protocol, some of which may be capable of advertising BGP announcements packets using OSPF, and others that may be capable of switching packets using MPLS. In some embodiments, the PE router 201 may have an additional interface capable of routing packets using the GRE tunneling protocol, and/or any other suitable tunneling protocol.

The interface on the PE router 201 may be capable of routing BGP advertisements using the BGP routing protocol or routing packets using the OSPF routing protocols to connect to one or more interfaces on the CE routers 211-219 capable of routing packets using, for example, the BGP or OSPF protocols. In some embodiments, some CE routers may only have interfaces that route BGP advertisements using the BGP routing protocol, and in other embodiments, the CE routers may only have interfaces that route packets using the OSPF routing protocol or another Interior Gateway Protocol (IGP). The PE router 201 may have one or more interfaces capable of switching packets using, for example, MPLS, and these one or more interfaces may forward packets to an interface on the PR 801 capable of receiving and sending packets using MPLS.

The one or more interfaces on the PE router 201 capable of switching packets using MPLS, may be an ingress router to a MPLS label switching path (LSP) when it sends packets received from one or more hosts at the Site 202 to the PR 801, which may be one of a plurality of Label Switching Routers (LSRs) along the LSP that the packets may traverse to reach their intended destination. For example, the PE router 201 may receive traffic, corresponding to the Host 295, from the CE router 219 on an interface capable of routing BGP advertisements or packets using, for example, BGP or OSPF respectively, with a destination address corresponding to the PE router 501 or the Host 595 respectively. The PE router 201 may look up the correct interface, in a RIB stored on the PE router 201, to switch the packet out based at least in part on the destination of the packet (e.g., the Host 595). In particular, after the PE router 201 looks up the correct interface to switch the packet out, the PE router 201 may determine that the correct interface corresponds to an MPLS Interface on the PE router 201 connected to an MPLS interface on the PR 801. The PE router 201 may attach a label to the packet corresponding to the MPLS interface, and may switch the labeled packet out the MPLS interface connected to the MPLS interface on the PR 801. The PR 801 may receive the labeled packet on a receiving interface, and may look up the correct interface, in a RIB stored on the PR 801, to switch the packet out based at least in part on the destination of the packet. Accordingly, the PR 801 may attach a new label to the packet and switch the packet out the interface corresponding to the new label. This process of receiving a labeled packet on an incoming interface and replacing the label on the incoming packet with a new label and sending it out an outgoing interface corresponding to the destination of the packet (e.g., the Host 595) may continue along a path of LSRs (e.g., the PR 807, the PR 811, and the firewall 521 and the firewall 531), thereby forming an LSP comprising the PE router 201, the PR 801, the PR 807, the PR 811, and the firewall 521 and 531 (the firewall pair 541). After the firewall 521 and the firewall 531 receive the labeled packet on an incoming MPLS interface, either the firewall 521 or the firewall 531 may remove the label from the labeled packet and route the packet out an interface connected to the PE router 501 using the OSPF routing protocol. The PE router 501 may receive the packet on an incoming interface capable of routing packets using the OSPF routing protocol, and may route the packets out an interface capable of routing packets using the same routing protocols to a CE router (e.g., the CE router 519) that may in turn route the packet to the Host 595. The CE router 519 may receive the packet on an incoming interface that routes packets using the OSPF routing protocol, and may send the packet out an interface connected to an interface on the Host 595 using the same routing protocol.

At each site, there may be two firewalls (a firewall pair) connecting the PE router to the enterprise backbone network. The firewall pair may comprise a first firewall that may analyze, monitor, filter, and route traffic received from hosts on different networks (e.g., an active firewall), and a second firewall that may analyze and monitor traffic in order to maintain the state of the firewall pair if the first firewall pair is disabled or fails. The systems and methods disclosed herein may enable the firewall pair to be a network firewall or a host-based firewall. In some embodiments, the firewall pair may contain one or more processors that may execute one or more instruction sets stored on one or more computer-readable media to cause the one or more processors to filter traffic between one or more networks. In other embodiments, the firewall pair may comprise specialized hardware that may filter traffic between one or more networks. The firewall pairs may perform similar operations to those executed by the PE router or P routers. In some embodiments the firewall pair may provide the same functionality as a Dynamic Host Control Protocol (DHCP) server and/or a VPN server.

The firewall pair may filter traffic between two networks (e.g., VPN networks or a VPN network and a non-VPN network) at the network level of the Open Systems Interconnection (OSI) model and therefore may filter (e.g., prevent or allow) Transmission Control Protocol/Internet Protocol (TCP/IP) traffic to pass between two networks. The firewall pair may filter traffic, when the processor executes one or more instruction sets stored on the computer-readable media to cause the processor and/or one or more other circuits in the firewall to allow (e.g., route packet out an interface to its destination) the packet to be routed between two networks, or to deny (e.g., discard the packet and not route it out an interface to its destination) the packet from being routed between two networks. A subset of the one or more instruction sets may comprise policies that may be used to cause the processor to determine whether traffic should be routed between two networks. A human network administrator may define the policies, or another subset of the one or more instruction sets may define the policies based on a traffic analysis as explained below. The firewall pair may be stateful or stateless.

If the firewall pair is stateful, the processor may analyze a connection between two hosts (e.g., the Host 295 on a first VPN and the Host 715 on a second VPN) that are transferring traffic to one another through a firewall pair that may infer the state of two devices generating the traffic. For example, traffic may be routed through a firewall pair separating the Hosts 295 and 715, and the firewall pair may monitor the source and destination address of the packets in the traffic, the Universal Datagram Protocol (UDP) or Transmission Control Protocol (TCP) ports that the two hosts are sending and receiving the traffic on, and/or the current state of the connection's lifetime (e.g., initiating a traffic session on the connection, a handshaking process between the two hosts, the transfer of traffic, or completion of the traffic session on the connection). If a packet in the traffic does not match an existing connection, the processor may evaluate the packet based on the policies and determine if the packet belongs to a new connection and, if it does, the processor may deny the packet from being routed between the two hosts. If the packet matches an existing connection based on the comparison with a processors state table (e.g., state of the connection's lifetime), the packet will be routed to the intended host.

If the firewall pair is stateless, the processor may determine if traffic being transferred between two hosts is being transferred using a stateless network protocol. In particular, if the processor determines that the traffic being transferred between two hosts on different networks is not being transferred using a session (e.g., an exchange of messages comprising packets are sent between two hosts to maintain a connection) based network protocol (e.g., IP and/or Hypertext Transfer Protocol (HTTP)), the processor may allow the traffic to be sent between the two networks.

The computer-readable media stored on the firewall pairs may also store one or more policies (e.g., instruction sets) that may cause the one or more processors in the firewall pair to use one or more routing policy values, associated with one or more routing protocols used by the firewall pairs and PE routers at each site, to assign one or more other routing policy values to a PE router that is collocated with the firewall pair, to route packets between hosts on different networks through a specific firewall pair. For instance, because a full mesh network connection is maintained between each PE router and each firewall pair, each firewall pair may receive a first routing policy value from each of the PE routers in the enterprise network which the firewall pair may share with the corresponding PE router that is collocated at the same site as the firewall pair that received the first routing policy value. For instance, a PE router at a site may advertise (e.g., send), to each firewall pair in the enterprise network, a sub-network prefix, corresponding to one or more hosts at the site that are assigned to a first network. The PE router may also advertise a first policy value associated with the one or more hosts at the site. The one or more hosts at the site may be referred to as a community, and the first policy value may be referred to as a community value. Each firewall pair may receive the sub-network prefix and community value, and store the sub-network prefix, the corresponding community value, and a host identifier (e.g., host name, IP address, and/or Medium Access Control (MAC)) in a table so that it may route packets to the one or more hosts when it receives traffic from hosts collocated at the site of the firewall pair. As explained above, the firewall pair may also receive traffic from hosts that are not collocated at the site, but rather assigned to a site based on the proximity of the host to a site, or based on the requirements of the host. For example, if a host comprises a plurality of servers requiring a certain amount of bandwidth, the host may not be assigned to the first network, but may be assigned to a network that can support the host's bandwidth requirements. In which case, the host may not be assigned to the site that is geographically closest to it, if the PE router and/or CE routers cannot support the bandwidth requirements, but rather may be assigned to another site with a PE router and/or CE routers that can support the host's bandwidth requirements.

Once the first policy value has been received by each of the firewall pairs, the one or more processors in the firewall pairs may execute the one or more policies stored in the computer-readable media to generate a second policy value that may be used locally by the corresponding PE router at the site to make a decision about which firewall pair it should route packets to that are destined for the one or more hosts corresponding to the sub-network prefix. For example, the PE router 501 may advertise a sub-network prefix for the Hosts 515 and 595, and a corresponding community value, in a BGP advertisement, to each firewall pair in the enterprise network 100 using the connections in the backbone network 800. Each firewall pair may receive the community value and based at least in part on the one or more policies stored in the computer-readable media, the one or more processors may store the sub-network prefix and corresponding community value in the computer-readable media in an array (e.g., table), and generate a second policy value. This second policy value may be referred to as a first local preference value, because it is local to the firewall pair receiving an advertisement from a PE router that initiated the advertisement. Each firewall pair may advertise the sub-network prefix value and a first local preference value to each PE router in the enterprise network because a full mesh network connection is maintained between each firewall pair and each PE router.

Returning to the example above, if there are one or more hosts in the community that want to access one or more hosts assigned to another network, the PE router connected to the one or more hosts assigned to the other network may advertise a sub-network prefix and community value to each firewall pair in the enterprise network corresponding to the one or more hosts in the other network. The firewall pairs may complete the same process described above for the PE router in the other network, and may send the sub-network prefix and a second local preference value associated with the one or more hosts in the other network to the PE router corresponding to the one or more hosts in the community.

The second local preference value for each firewall pair may be based on, in addition to the community value associated with the one or more hosts at the other network, the first local preference value. In particular, the PE router corresponding to the one or more hosts in the other network may generate a community value that may cause the firewall pairs to generate a second local preference value that may cause the PE router associated with the community, to route packets through the same firewall pair that the PE router in the other network may use when the hosts in the respective networks want to communicate. For example, the PE router 501 may advertise a sub-network prefix, corresponding to the Hosts 515 and 585 (not shown) that may want to access content hosted on the Host 335, and a corresponding first community value associated with the sub-network prefix to each firewall pair in enterprise network 100. The community value is advertised in a BGP advertisement. Each firewall pair may generate a first local preference value, which may or may not be the same value, and send it to the PE router 301 because it is the PE router that may route packets to the Host 335 from other hosts in enterprise network 100. It may be desirable for the PE router 501 to send requests to access content on the Hosts 515 and 585 through the same firewall pair that it may receive the content through, in order to ensure that the flow of traffic between the Hosts 515 and 585 and the Host 335 is symmetric (e.g., traffic between two hosts in either direction is routed through the same firewall pair). In order for the PE router 501 and the PE router 301 to route packets through the same firewall pair (e.g., the firewall 521 and the firewall 531) when traffic is sent across the backbone network 800 between the Hosts 515 and 585 and the Host 335, the first and second local preference values may have to be set in such a way that the PE router 501 and the PE router 301 select the local preference value advertised by the firewall 521 and the firewall 531. As explained below with reference to FIGS. 8-10, the highest first local preference value received by the PE router 301, from all firewall pairs in enterprise network 100, may be selected by the PE router 301 to route traffic from the Host 335 to the Hosts 515 and 585. Consequently, the PE router 301 may advertise a second community value to each firewall pair that may cause the firewall 521 and the firewall 531 to advertise a second local preference value to the PE router 501 that is greater than any other second local preference value advertised by the firewall 521 and the firewall 531. This may cause the PE router 501 to route requests for content on the Host 335 from the Hosts 515 and 585 through the firewall 521 and the firewall 531. The second community value may be selected, and the second local preference value may be generated based on the first community value discussed below with reference to FIGS. 8-10.

The firewall pairs 241-741 may contain one or more computer-readable media storing one or more instruction sets that may be executed by one or more processors to cause the one or more processors to perform one or more of the same functions and/or operations described above. The firewall pair 241 may comprise the firewalls 231 and 221, the firewall pair 341 may comprise the firewalls 331 and 321, the firewall pair 441 may comprise the firewalls 431 and 421, the firewall pairs 541 may comprise the firewalls 531 and 521, the firewall pair 641 may comprise the firewalls 621 and 631, the firewall pair 741 may comprise the firewalls 721 and 731.

Figure 2A:
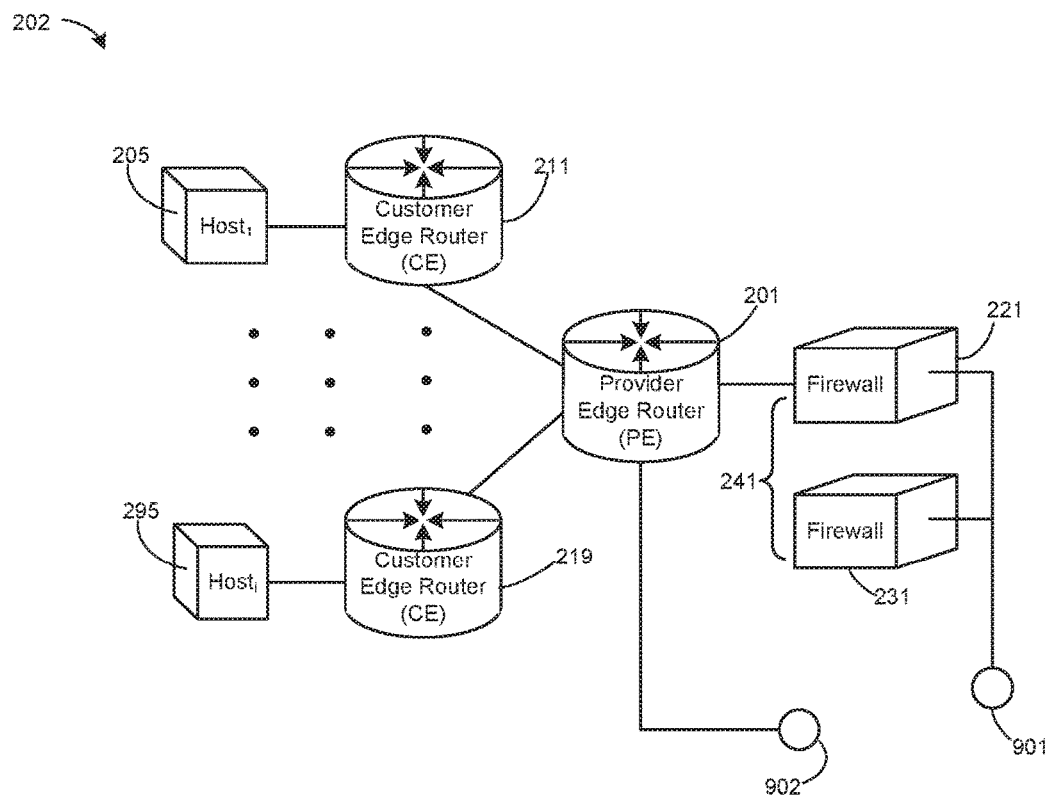
FIGS. 2A-G are illustrative example site network environments, in accordance with example embodiments of the disclosure.
Figure 2B:
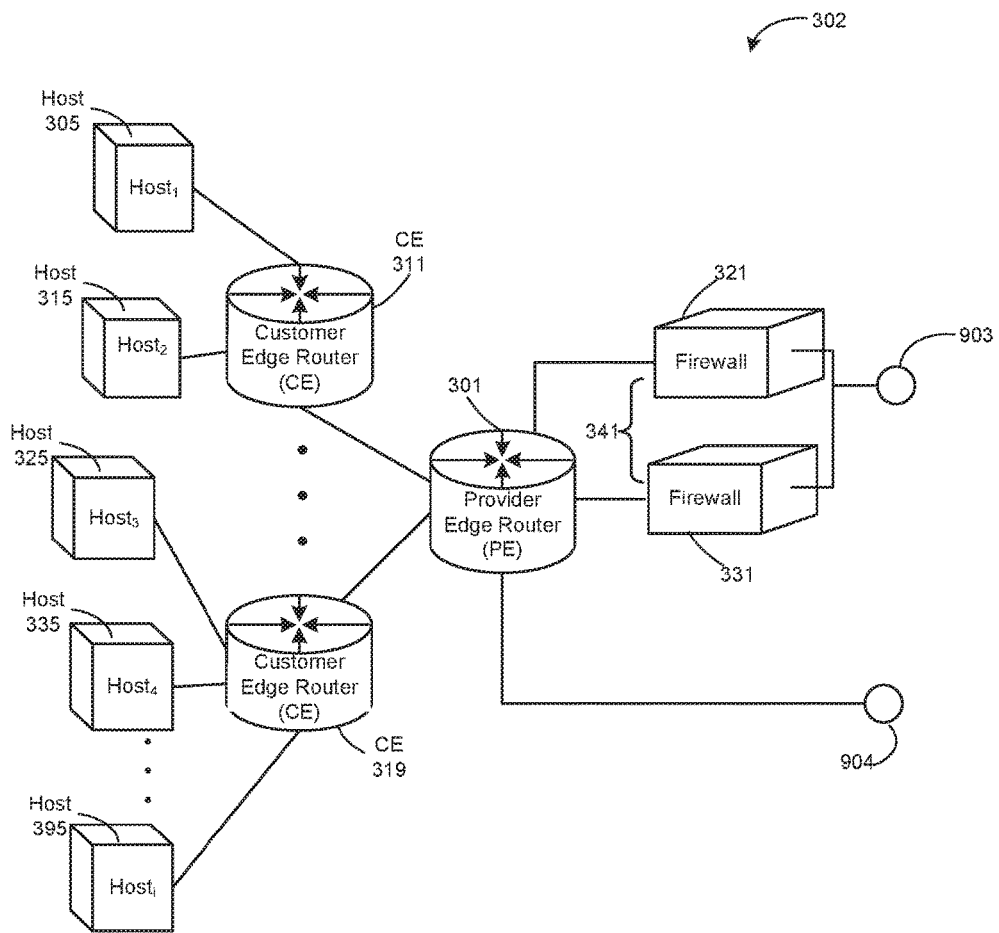
Figure 2C:
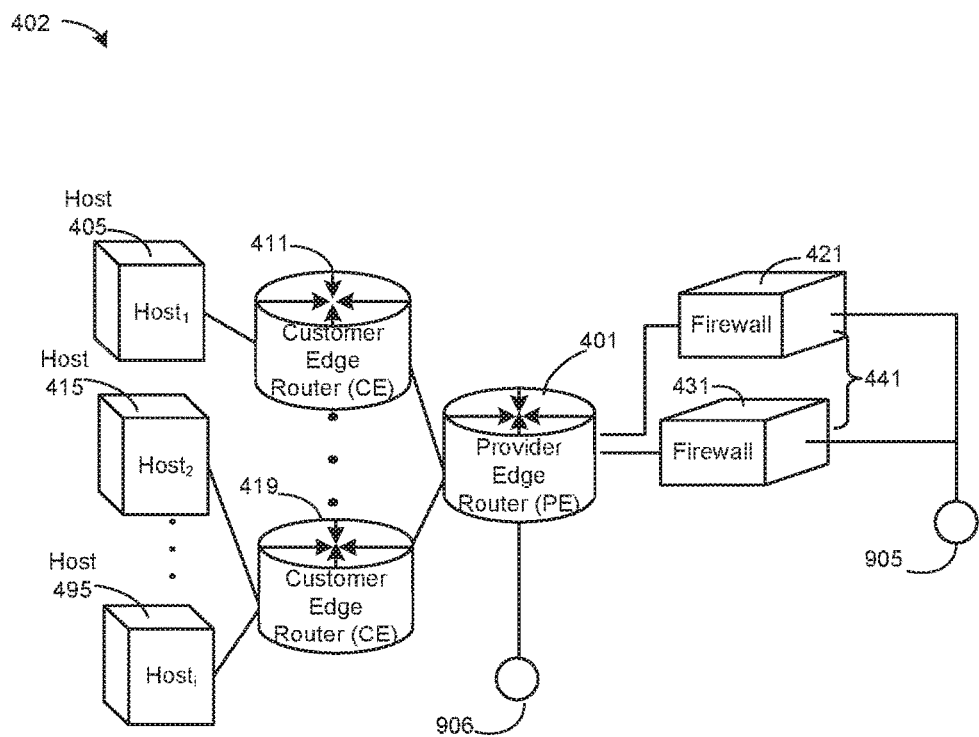
Figure 2D:
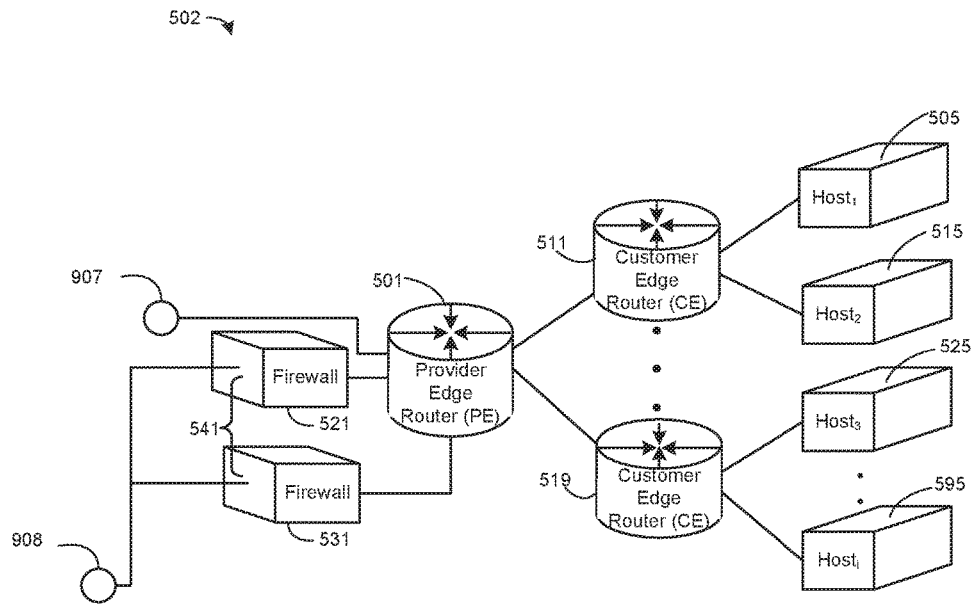
Figure 2E:
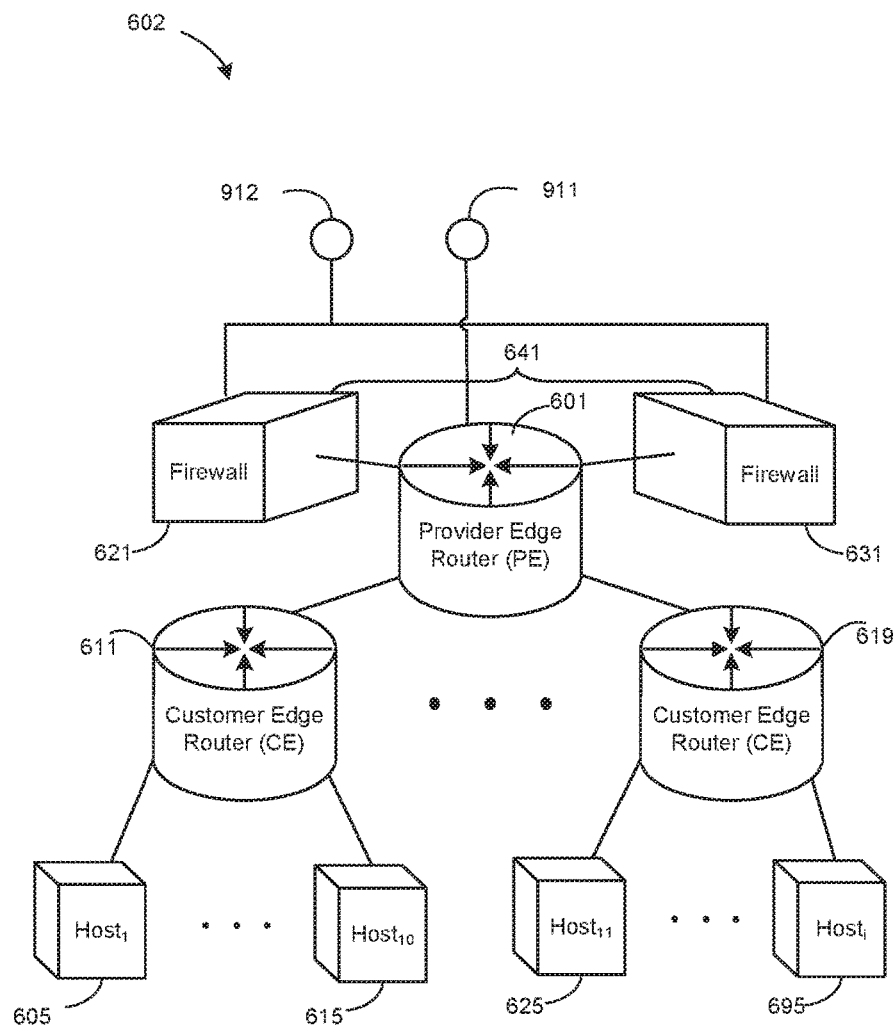
Figure 2F:
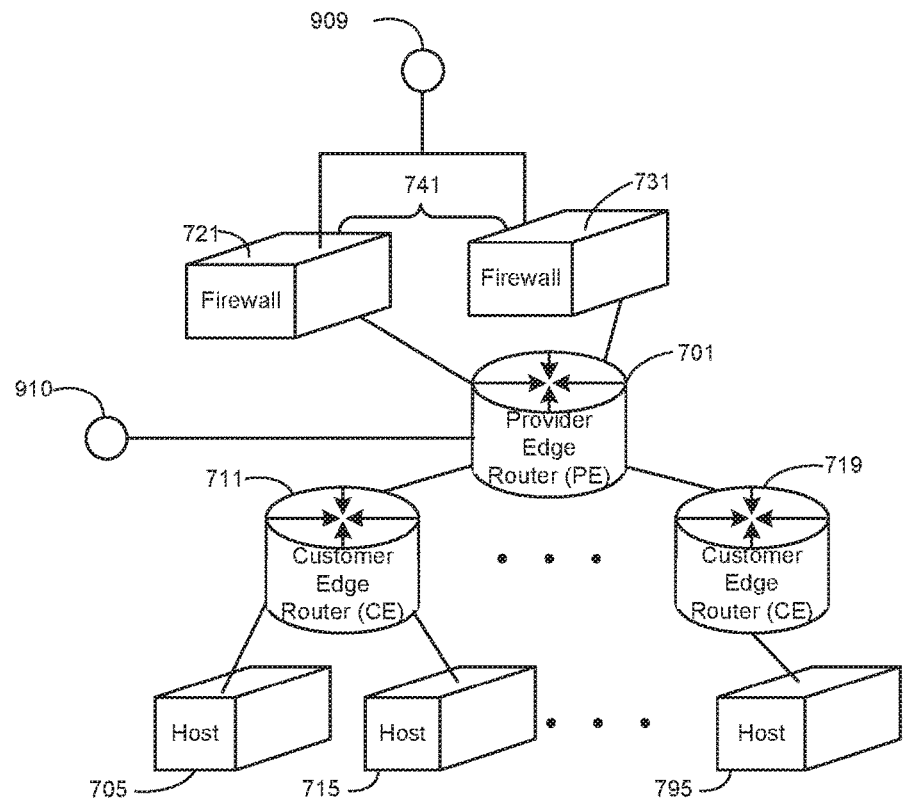
Figure 2G:
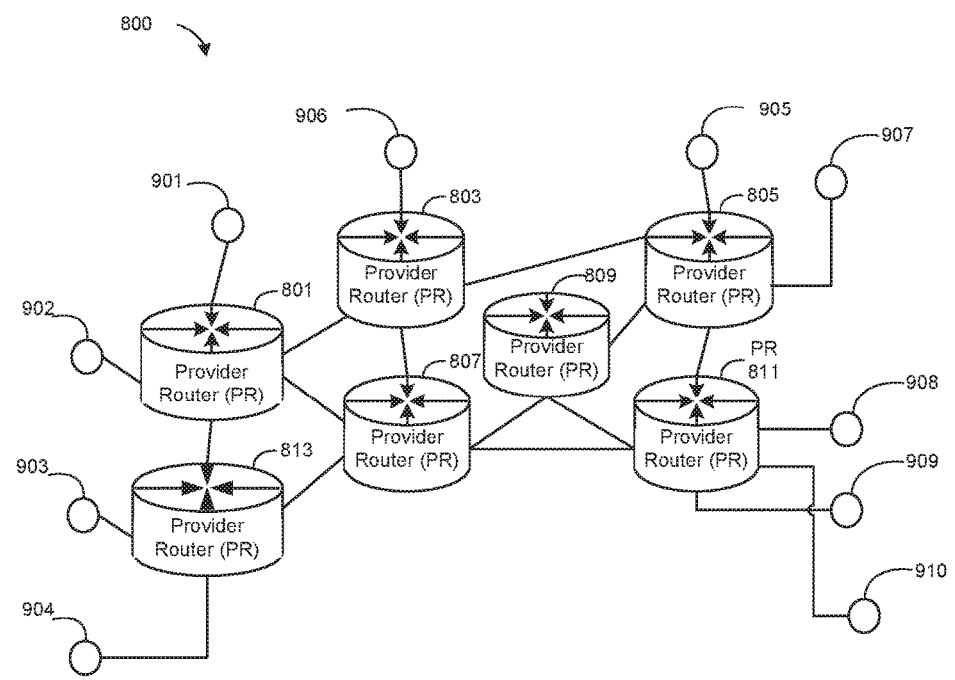

The interfaces 901-910 in FIGS. 2A-F may correspond to the interfaces 901-910 in FIG. 2G. The interfaces 901-910 may be points of physical or logical connection between the Sites 202-702 and the backbone network 800. For example the interfaces 901 and 902 in FIG. 2A may correspond to the interfaces 901 and 902 in FIG. 2G. Similarly in FIGS. 2B-2G, the one or more interfaces at the Sites 302-702 may correspond to the one or more interfaces at the backbone network 800. The backbone network 800 also comprises PRs 801, 803, 805, 807, 809, 811, and 813 which may have computer-executable instructions stored in a memory that may cause at least one processor and network interface card (NIC) to implement a label switching protocol. In particular the PRs 801, 803, 805, 807, 809, 811, and 813 may implement a MPLS protocol wherein the PRs 801, 803, 805, 807, 809, 811, and 813 receive a packet with a first label (variable and/or fixed length) on a first interface(s), removes the first label and determines a second label to attach to the packet and sends the packet with the second label out a second interface(s). In some embodiments the PRs 801, 803, 805, 807, 809, 811, and 813 may send the packet with the second label out the first interface(s).

Figure 3:
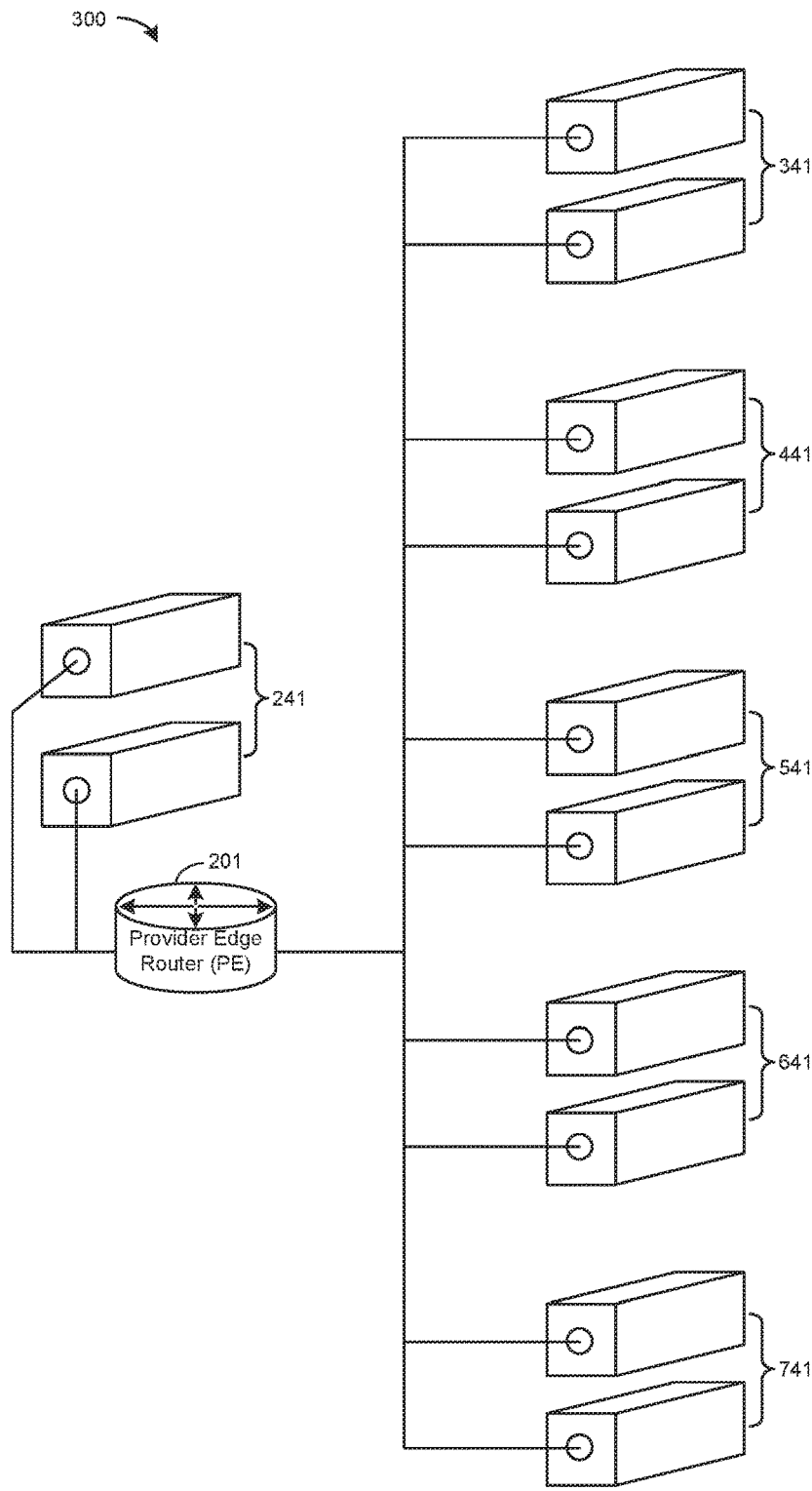
FIG. 3 is an illustrative example logical network diagram, in accordance with example embodiments of the disclosure.

FIG. 3 is an example logical network diagram illustrating logical network connections between a PE router (e.g., the PE router 201) and each firewall pair in the enterprise network 100 in FIGS. 1 and 2. The PE router 201 may maintain one or more network connection sessions (e.g., Internal Border Gateway Protocol (IBGP) sessions) with the firewall pairs 241-741 as illustrated in FIG. 3. This may be referred to as a full mesh logical network connection because the PE router 201 maintains the one or more network connection sessions with each firewall pair in the network. As explained above, each site may comprise the firewalls 221-721 and the firewalls 231-731. A logical network connection between the PE router 201 and a given firewall pair may be represented by a physical network path between the two network devices (e.g., a Label Switch Path (LSP) between the PE router 201 and a firewall pair). For example, the logical network connection between the PE router 201 and the firewall pair 641 may be represented by an LSP comprising the PE router 201, the PR 801, the PR 807, and the firewall 621 and the firewall 631, wherein the PE router 201 and the firewall 621 and the firewall 631 may both be ingress and egress LSRs for traffic leaving and entering their respective sites (e.g., the Site 202 and the Site 602). Alternatively, and/or additionally, another LSP may comprise the PE router 201, the PR 801, the PR 813, and the firewall 621 and the firewall 631 wherein once again the PE router 201 and the firewall 621 and the firewall 631 may both be ingress and egress LSRs for traffic leaving and entering their respective sites. One or more LSPs may be represented by the full mesh logical network connections between the PE router 201 and the firewall pairs illustrated in FIG. 3.

FIGS. 4-7 are illustrative routing tables that may be stored by exemplary routers and firewall pairs disclosed herein. FIG. 4 may be a routing table corresponding to one or more instruction sets, stored on one or more computer-readable media, that when executed by one or more processors in a PE router may cause the processor to send one or more packets out an interface to one or more routers and/or firewall pairs. The routing table in FIG. 4 may be a visual representation of the one or more instruction sets stored in one or more computer-readable media in a PE router (e.g., the PE router 201). FIG. 4 may be a routing table used by the PE router 201 to maintain one or more network connection sessions with one or more other PE routers and firewall pairs. For example, the PE router 201 may comprise entries for the PE routers 201-701 and the firewall pairs 241-741 corresponding to the Sites 202-702. The routing table may be organized according to sites in ascending order with the PE routers and the firewall pairs at the lowest number site listed in a first section and the PE routers and the firewall pairs at the highest number site listed in a last section. For example, Internal Routing Table (IRT) 400 may be divided into six sections each of which corresponds to a site. Each section may comprise three rows and six columns. The first row of a section may correspond to the PE router at a site, and the second and third rows may correspond to the firewall pairs at the site. For example, the first row in the first section of IRT 400 may comprise information about the PE router 201, the second row in the first section of IRT 400 may comprise information about the firewall 221, and the third row in the first section of IRT 400 may comprise information about the firewall 231.

For instance, the first column may correspond to a router name (e.g., the router/firewall name 491), associated with the PE router 201 (e.g., the PE router 201), the second column may correspond to an IP address associated with the PE router 201 (e.g., 2.1.0.0), the third column may correspond to a sub-network prefix (e.g., the Sub-network Prefix 493) associated with the PE router 201 (2.0.0.0/8), the fourth column may correspond to the next PE router or the firewall pair (e.g., the Next Hop 494) that the PE router 201 should send packets to when routing packets to the PE router or the firewall pair listed in the first column (e.g., next hop is 2.1.0.0), the fifth column may comprise one or more community values (e.g., the Community Value 495) associated with one or more communities at the site that the PE router may advertise to the firewall pairs in enterprise network 100 via a BGP advertisement. The sixth column may correspond to one or more local preference values (e.g., the Local Preference Value 496) received from the firewall pairs in enterprise network 100. In this example, it should be noted that the IP address in the Next Hop 494 is the IP address of the PE router itself (e.g., 2.1.0.0) because the PE router in the first row is the PE router 201 and the corresponding IP address in the IP address column (e.g., the address 492) is 2.1.0.0. The second and third rows of the first section of IRT 400 may comprise information about the firewalls 221 and 231.

The second section of IRT 400 may comprise information about the PE router and the firewall pair at the Site 302. For example, the first row in the second section of IRT 400 may comprise information about the PE router 301. For instance, the first column may correspond to a router name (e.g., the router/firewall name 491), associated with the PE router 301 (e.g., the PE router 301), the second column may correspond to an IP address associated with the PE router 301 (e.g., 3.1.0.0), the third column may correspond to a sub-network prefix (e.g., the Sub-network Prefix 493) associated with the PE router 301 (3.0.0.0/8), the fourth column may correspond to the next PE router or the firewall pair (e.g., the Next Hop 494) that the PE router 201 should send packets to when routing packets to the PE router or the firewall pair listed in the first column (e.g., next hop is 8.0.0.1), the fifth column may correspond to one or more community values (e.g., the Community Value 495) associated with one or more communities at the site that the PE router may advertise to the firewall pairs in enterprise network 100. The sixth column may correspond to one or more local preference values (e.g., the Local Preference Value 496) received from the firewall pairs in enterprise network 100. In this example, it should be noted that the IP address in the Next Hop 494 is the IP address associated with the PE router 801. The second and third rows of the second section of IRT 400 may comprise information about the firewalls 321 and 331. It may be noted that for the firewalls 221 and 231 the local preference values are not received from other firewall pairs, but rather generated by the firewalls 221 and 231. The community values and local preference values may be generated in accordance with the processes explained above and below. The remaining sections of IRT 400 are not shown, but comprise information similar to that described above with respect to sections one and two. The letter N may correspond to the number of communities (i.e., the Community Value 495) and the letter M may correspond to the number of local preference values (i.e., the Local Preference Value 496) each of which may be generated by a firewall pair.

Each community may comprise one or more hosts, and the number of communities created may be based at least in part on one or more policies stored in memory on a PE router. For example, the one or more policies may include instructions that cause the PE router to assign one or more hosts, collocated at the same site as the PE router or other sites in the network, to one or more communities based on requirements of the hosts (e.g., network requirements). For instance, in some embodiments, the PE router may place one or more hosts in the same community based at least in part on bandwidth requirements to send and receive packets. In other embodiments the PE router may place one or more hosts in the same community based at least in part on jitter requirements (i.e., if the jitter experienced by packets transmitted between hosts exceeds a certain threshold).

The number of local preference values may correspond to the number of the firewall pairs that are operating. The firewall pair may generate a local preference value. Therefore in some embodiments, the number of local preference values may be equal to the number of the firewall pairs in the network. In some embodiments, the number of local preference values may be less than the number of the firewall pairs in the network if a policy on the PE router restricts access to a subset of all of the firewall pairs in the network.

FIG. 5 is an illustrative representation of a table comprising routing information that may be used by a PE router at a site (e.g., the PE router 201), to route packets received from one or more hosts at the site, to one or more other hosts in enterprise network 100 that are assigned to the same VPN as the one or more hosts at the site. VPN Table 500 may comprise similar information to that included in IRT 400. However, instead of including routing information about the PE routers and the firewall pairs in the network, it may include information about one or more hosts assigned to a particular VPN. VPN Table 500 may contain routing information that may be stored on a PE router to route one or more packets between one or more hosts assigned to the same VPN. For instance, VPN Table 500 may comprise a first column comprising names corresponding to one or more hosts assigned to the VPN (e.g., the Host Name 591). VPN Table 500 may comprise a second column comprising addresses corresponding to each of the one or more hosts assigned to the VPN (e.g., the Address 592). It may also comprise a third column comprising sub-network prefixes associated with one or more hosts, that one or more packets are destined for, and that may be assigned to the VPN (e.g., the Sub-Network Prefix 593). VPN Table 500 may also comprise a fourth column comprising IP addresses corresponding to the PE router or the firewall pair that may be the next hop neighbor (e.g., the Next Hop 594) for the PE router 201 when routing packets to the hosts listed in the first column. VPN Table 500 may comprise a community values (e.g., the Community Values 595). The Community Value 595 may be similar to Community Value 495. VPN Table 500 may comprise a label column (e.g., the Label 596) specifying which label the PE router (e.g., the PE router 201) should use to route the packet to the hosts in the first column. VPN Table 500 may be used by the PE router 201 to route packets from the PE router 201, received from one or more hosts at the Site 202, to the Hosts 305 and 795 that may be assigned to the same VPN as the Hosts 305 and 795. For example, the PE router 201 may receive a request from the Host 235 to access content on the Hosts 305 and 795, and the PE router 201 may select the labels $L_1$ and $L_2$ (Labels 596) respectively to route packets to the Hosts 305 and 795 through the backbone network 800 using the PR 801 as the next hop router. The PE router 201 may be the ingress router, and may attach the labels $L_1$ and $L_2$ to the respective packets destined for the Hosts 305 and 795 and send the labeled packets to the PR 801 to route across the backbone network 800 to the PE routers 301 and 701 respectively, which may remove the labels $L_1$ and $L_2$ and route the packets to the Hosts 305 and 795 respectively. The PE routers 301 and 701 may be the egress routers, and the labeled packets may be routed across the backbone network 800 using MPLS.

FIG. 6 is an illustrative representation of a table comprising routing information that may be used by a PE router (e.g., the PE router 201) at a site, to route packets received from one or more hosts at the site, to one or more other hosts in enterprise network 100 that are not assigned to the same VPN as the one or more hosts at the site. VPN Table 600 may comprise the same routing table information that is included in VPN Table 500, including the Host Name 691, the address 692, the Sub-Network Prefix 693, the Next Hop 694, and the Community Value 695. Each of the entries in these columns may represent the same information included in the entries in VPN Table 500. VPN Table 600 may also include the Local Preference Value 696, which may include one or more local preference values. There may be six local preference values each of which corresponds to a local preference value generated by a firewall pair and received from the firewall pairs by the PE router 201. They may be associated with the host in the column the Host Name 691 and corresponding sub-network prefix in the column the Sub-Network Prefix 693. As explained above, a PE router may select the local preference value with the greatest numerical value and route traffic through the firewall pair corresponding to that local preference value, to the intended host(s).

If a host (e.g., the Host 295) is assigned to a community with a community value $CV_{32}$, and assigned to a different network (e.g., VPN) than the hosts in the column the Host Name 691, the PE router 201 may use VPN Table 600 to route requests from the Host 295, to access content on another host that is not in the same VPN. In order to do this, the PE router 201 may select the local preference value with the greatest numerical value corresponding to the one or more hosts that the Host 295 is requesting content from. For example, if the Host 295 is requesting access to content hosted on the Hosts 615, 525, and 715, the PE router 201 may select the greatest local preference values from $LV_{61}$-$LV_{6M}$, $LV_{61}$-$LV_{6M}$, and $LV_{61}$-$LV_{6M}$ respectively and send the request to the corresponding firewall pairs. The second subscript numeral may represent a numerical value assigned to a site. For instance, the second subscript numerals 1-M may represent the sites 1 through M. Although there are only six sites illustrated in enterprise network 100, which would limit the number of local preference values to M=6, this number was merely selected for illustrative purposes. The number of sites could be assigned any non-zero natural number. Accordingly, a second subscript value of 1-6 may represent the Sites 202-702 respectively.

As an example, if $LV_{65}$, $LV_{54}$, and $LV_{76}$ are the local preference values with the greatest numerical values for the Hosts 615, 525, and 715 respectively, the PE router 201 may select the corresponding firewall pairs to route the requests from the Host 295 to the Hosts 615, 525, and 715. For example, $LV_{65}$, $LV_{54}$, and $LV_{76}$ may be the value stored in the PE router 201, associated with the firewall pairs at the Sites 602, 502, and 702 respectively. In some embodiments, the local preference value with the greatest numerical value may not coincide with the firewall pair collocated with the hosts receiving the requests for access to content. For instance, if the firewall pairs at the Sites 602, 502, and 702 were disabled for maintenance, the PE router 201 may select a local preference value, with the second greatest numerical value (e.g., $LV_{63}$, $LV_{52}$, and $LV_{74}$), corresponding to each of the hosts (e.g., the Hosts 615, 525, and 715 respectively), to continue routing packets to the hosts hosting the content (i.e., the Hosts 615, 525, and 715).

FIG. 7 is an illustrative representation of a table comprising routing information that may be used by the firewall pairs in enterprise network 100 to route packets between one or more hosts in two different networks (e.g., VPNs). VPN Table 700 may comprise the same information included in VPN Table 600. The firewall pairs may route packets through the backbone network 800 the same way the PE routers in enterprise network 100 route packets through the backbone network 800 using MPLS. VPN Table 700 may be used by the firewalls 221 and 231 to route packets from one or more hosts collocated at the Site 202 to the one or more hosts in the column the Host Name 791. For example, the Host 255 may send a request to the PE router 201 to access content hosted on the Host 415 to the PE router 201. The PE router 201 may read the entries of a VPN Table and determine that the Host 415 is not in the same VPN as the Host 255 and may forward the request to the firewalls 221 and 231 out an interface connected to an interface on the firewalls 221 and 231 using an OSPF routing protocol. In some embodiments, other IGPs, other than OSPF, may be used. For example, IS-IS, Enhanced Interior Gateway Routing Protocol (EIGRP), or a static routing protocol may be used. The firewalls 221 and 231 may in turn receive the request on an OSPF interface, add a label 707 (e.g., the $L_1$) and forward the request out an MPLS interface to an MPLS interface on the next hop LSR (e.g., the PR 801) which may route the request over the backbone network 800 to the PE router 401 which may remove the label ($L_1$) and route the request to the Host 415 using the OSPF routing protocol. The community value (e.g., the Community Value 795) may be a value corresponding to the community that the Host 255 may be assigned to, and may have been received from the PE router 201 when the Host 255 requested a connection to the Host 415. The local preference value in the Local Preference Value 796 for the Host 415 (e.g., $LV_1$) may be a local preference value generated by the firewalls 221 and 231 after receiving a community value from the PE router 401. Receipt of the community value and generation of the local preference value may occur, before the Host 255 requests access to the content at the Host 415, during a setup phase in which the Host 225 requests a connection to the Host 415. The entry in the address 792 may correspond to the address of the Host 415 (e.g., 4.1.19.15), the entry in the Sub-Network Prefix 793 may correspond to the sub-network that the Host 415 belongs to (e.g., 4.1.19.0/24), and the entry in the Next Hop 794 may correspond to the IP address of the next hop LSR of the firewalls 221 and 231 that the firewalls 221 and 231 should send packets o destined for the Host 415 (e.g., 8.0.0.1). The other entries in VPN Table 700 may correspond to routing information that may be used by the firewalls 221 and 231 to route packets from one or more other hosts at the Site 202. For example, the Host 205 may request access to content hosted on the Hosts 505, 625, and 605, the Host 225 may request access to content hosted on the Host 705, and the Host 295 may request access to content hosted on the Hosts 315, 325, and 335. The firewalls 221 and 231 may route traffic between the hosts as explained above.

Figure 8:
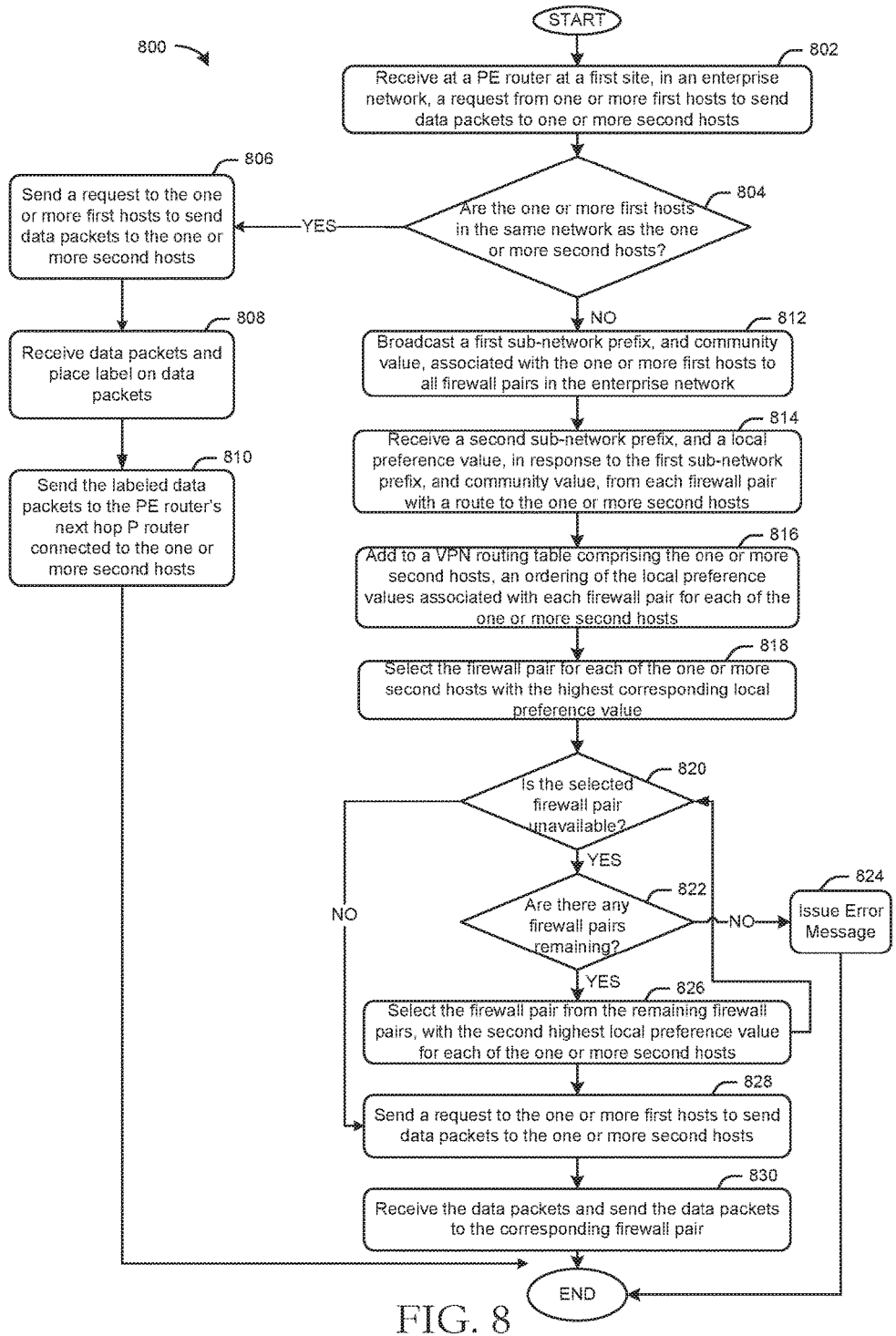
FIG. 8 is a flow diagram illustrating an example dataflow for establishing symmetric traffic between routers connecting one or more hosts on different networks through a firewall pair, in accordance with certain example embodiments of the disclosure.

FIG. 8 is an exemplary flow diagram illustrating an example dataflow for establishing symmetric traffic between routers connecting one or more hosts on different networks through a firewall pair. Referring to FIG. 8, it will be readily appreciated by one of ordinary skill in the art that the illustrated procedure may be altered to delete blocks or further include additional blocks. In diagram 800, a PE router (e.g., the PE router 201) at a first site (e.g., the Site 202), in an enterprise network (e.g., enterprise network 100), may receive a request from one or more first hosts (e.g., the Hosts 205 and 295) to send data packets to one or more second hosts (block 802). The PE router may receive the request from the one or more first hosts, on an interface that routes packets using an OSPF routing protocol.

After the PE router receives the request, it may determine if the one or more first hosts are assigned to the same network as the one or more second hosts, by searching one or more VPN Tables stored on the PE router (block 804). The one or more VPN Tables may be similar to VPN Tables 500 and 600 in FIGS. 5 and 6 respectively. After block 804, the PE router may find a VPN Table with the one or more second hosts in it, and determine that the one or more first hosts are in the same network, and may send a request to the one or more first hosts to send data packets to the one or more second hosts (block 806). In block 808, the PE router may receive one or more data packets from the one or more first hosts, and place labels on the one or more data packets. After the PE router labels the one or more data packets, the PE router may send the labeled one or more data packets out an interface to the PE router's next hop P router (block 810). For example, if the PE router 201 receives one or more data packets from the Hosts 205 and 295, which are destined for the Host 635, the PE router 201 may label the one or more data packets, and forward the one or more data packets from the Hosts 205 and 295 to the PR 801. The PR 801 may forward the one or more labeled data packets across the backbone network 800 to the PE router 601, which may in turn remove the labels from the one or more data packets and forward them to the Host 635 using an OSPF routing protocol through one or more of the CE routers 611-619. After the PE router sends the labeled packets to its next hop P router, the method may end. Returning to block 804, if the one or more first hosts do not belong to the same network as the one or more second hosts, the PE router may broadcast a first sub-network prefix and community value associated with the one or more first hosts to all firewall pairs in the enterprise network in block 812 via a BGP advertisement. The PE router may receive a second sub-network prefix, and a local preference value, in response to the first sub-network prefix, and community value, from each firewall pair with a route to the one or more second hosts via a BGP advertisement (block 814). After receiving the second sub-network prefix and second local preference value, the PE router may add this information to the VPN Table, and order the local preference values corresponding to each firewall pair for each of the one or more second hosts (block 816). The second local preference value may be based at least in part on another community value received, at each firewall pair, from a PE router associated with the one or more second hosts and another local preference value generated by each firewall pair in response to the community value received from the PE router associated with the one or more first hosts. This is discussed below with reference to FIG. 9. After block 816, the PE router may select the firewall pair for each of the one or more second hosts with the highest corresponding local preference values in block 818. The PE router may determine in block 820 if the selected firewall pairs are unavailable. A firewall pair may be unavailable due to scheduled maintenance, or because it stopped working (e.g., hardware and/or software failure). If the PE router determines that the firewall pairs are available, the PE router may send a request to the one or more first hosts to send data packets to the one or more second hosts (block 828). In block 830, the PE router may then receive the one or more data packets and send them to the corresponding firewall pairs. After the PE router sends the one or more data packets to the firewall pairs, the method may end. If the PE router determines that the selected firewall pair is unavailable, the PE router may determine if there are any firewall pairs remaining in the VPN Table (block 822). If the PE router determines that there are no firewall pairs remaining, it may issue an error message in block 824, and the method may proceed to end. If the PE router determines that there are firewall pairs remaining in the VPN Table, the PE router may select a firewall pair from the remaining firewall pairs, with the next highest local preference value for each of the one or more second hosts in block 826. The method may then return to block 820 to determine if the selected firewall pair is unavailable. The method may continue to return to block 820 until either a firewall pair is available and the method progresses to block 826, or an error message is issued in block 824.

Figure 9:
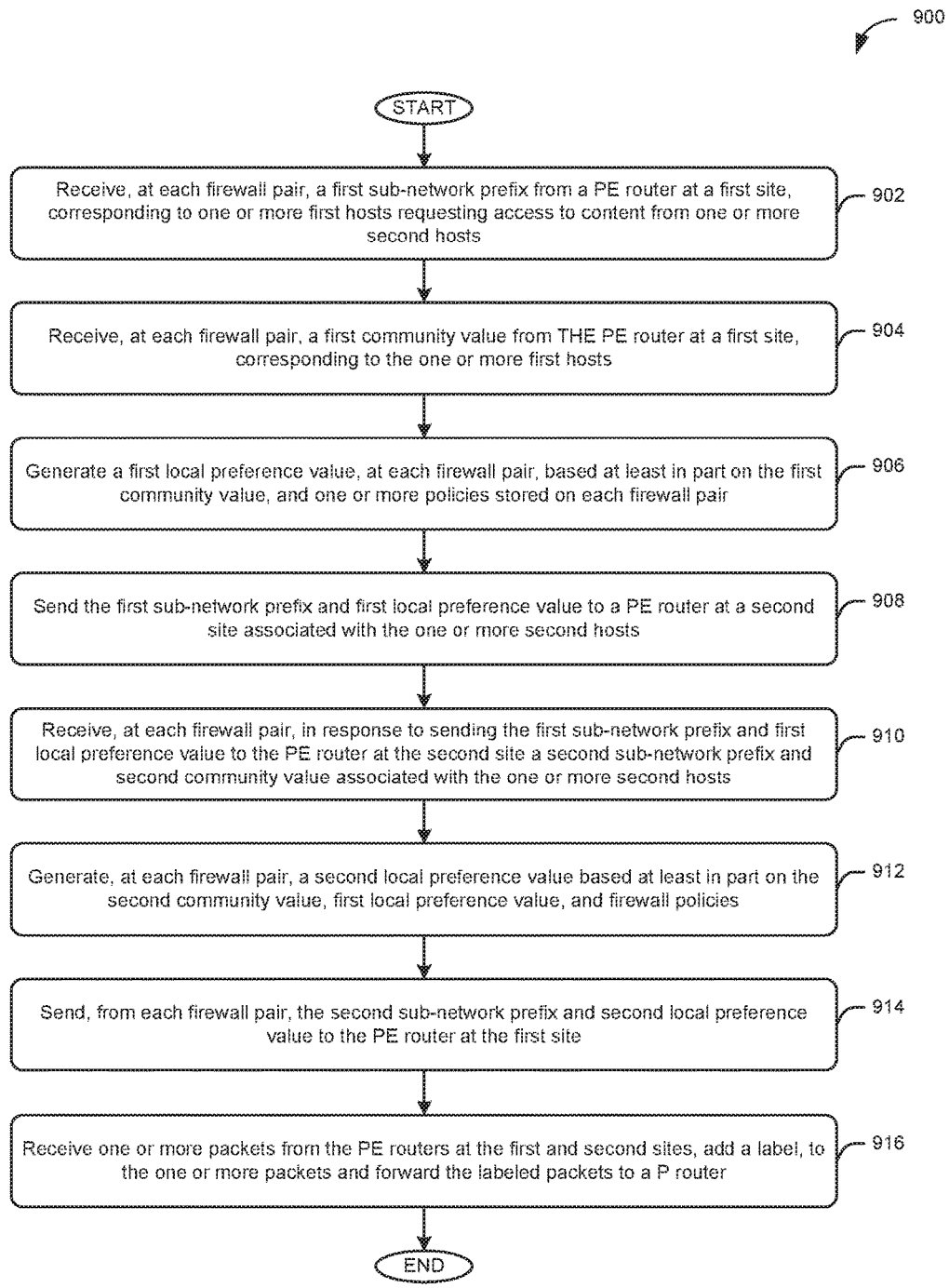
FIG. 9 is a flow diagram illustrating an example dataflow for establishing symmetric traffic across firewall pairs at different enterprise network sites, in accordance with certain example embodiments of the disclosure.

FIG. 9 is a flow diagram illustrating an example dataflow for establishing symmetric traffic across firewall pairs at different enterprise network sites. In diagram 900, the firewall pairs referenced in FIG. 8 may receive a first sub-network prefix from a PE router at the first site, in block 902, corresponding to one or more first hosts requesting access to content hosted by one or more second hosts assigned to a different network than the one or more first hosts. The one or more second hosts may be at a different site, or they may be at the same site, and as explained below all traffic routed between the first one or more hosts and the second one or more hosts may be routed through the firewall pair collocated at the site of the PE router, or another site depending on the local preference values advertised to the PE router from the firewall pairs for the first one or more hosts and the second one or more hosts. The local preference values may be advertised in a BGP advertisement. After block 902, each firewall pair may receive a first community value from the PE router at the first site corresponding to the one or more first hosts in block 904. The first community value may be sent to each firewall pair from the PE router in a BGP advertisement.

Each firewall pair may generate a first local preference value, based at least in part on the first community value, and one or more policies stored on the firewall pairs at block 906.

In particular, each firewall pair may store one or more policies that may make the firewall pair generate a first local preference value in response to the first community value received from the PE router. Therefore the first community value and one or more policies stored on the firewall pairs may be used to determine the local preference values associated with the firewall pairs. For example, the first community value may be a certain numerical value that may be used along with the one or more policies stored on the firewall pairs to generate a corresponding first local preference value. The one or more policies may be based on the analysis of the history of traffic patterns routed through the firewall pair. For example, the analysis of the history of traffic patterns may include analyzing the bandwidth requirements for delivering the content requested by one or more hosts. If the bandwidth required to deliver content from one or more hosts, on a first network, to one or more hosts, on a second network, exceeds a threshold beyond which the firewall pair can process the requested content, at a certain rate, the firewall pair may assign a lower first local preference value to itself than a firewall pair that may be able to process the content at a higher rate. Based on the first community value, each firewall pair may generate a unique first local preference value that may or may not be the same as the first local preference values of the other firewall pairs. If the first local preference values are the same, the PE router receiving the first local preference values may determine which firewall pair to use based on one or more policies stored on the PE router. For example, if the first local preference values are the same, one or more of the policies may cause the PE router to select a firewall pair based on interfaces that the PE router used in the past to maintain a symmetric flow of traffic between the one or more hosts on the first network and the one or more hosts on the second network. Accordingly, the first community value may be used in addition to the policies stored on the firewall pairs to determine the first local preference value. After the first local preference values are generated in block 906, each firewall pair may send a first sub-network prefix and the first local preference value to a PE router at a second site associated with the one or more second hosts (block 908). The first local preference value may be sent in a BGP advertisement. The one or more second hosts may host content that the one or more first hosts want to access. In some embodiments, each firewall pair may send the first sub-network prefix and the first local preference values to the same PE router that it received the community value from (e.g., the PE router at the first site).

For example, if the first one or more hosts are physically connected at the Site 202, and belong to a first network (e.g., VPN 1) and the one or more second hosts are physically connected at the Site 202, and belong to a second network (e.g., VPN 2), the PE router 201 may send the first community value to the firewall pairs 241-741, which may in turn generate first local preference values as explained above in block 906. The firewall pair may send the first local preference values and a first sub-network prefix associated with the first one or more hosts back to the PE router 201 because the second one or more hosts are connected to the PE router 201.

After the firewall pairs send the first sub-network prefix and first local preference value to the PE router at the second site, they may receive a second sub-network prefix and second community value associated with the one or more second hosts in block 910. The second community value may be received in a BGP advertisement. The second community value may be generated by the PE router at the second site based at least in part on the first local preference values received from each of the firewall pairs. The firewall pairs may generate a second local preference value based at least in part on the second community value, the first local preference value, and one or more policies stored on the firewall pairs in block 912. In particular, the one or more policies and second community value may be used by the firewall pairs to generate a numerical value for the second local preference value. For example, a PE router (e.g., the PE router 301) at a second site (e.g., the Site 302) may be assigned to a first network (e.g., VPN 1), and may determine that the firewalls 321 and 331 advertised a first local preference value with the greatest numerical value of all the numerical values corresponding to local preference values associated with the firewall pairs in the network, and therefore may use this firewall pair to send packets to a host (e.g., the Host 505) on a second network (e.g., VPN 2) at a first site (e.g., the Site 502), from one or more hosts (e.g., the Hosts 315 and 395) assigned to VPN 1. The PE router 301 may generate a community value, associated with the community that the Hosts 315 and 395 are assigned to, such that it may cause the firewall pair to generate a second local preference value, using the community value and policies stored therein, for the firewalls 321 and 331 that is greater than the second local preference values generated by the other firewall pairs in enterprise network 100. When the PE router at the second site selects the community value as described above, the flow of traffic between one or more hosts assigned to two networks may be guaranteed to traverse a predetermined firewall pair. This may be referred to as a bidirectional symmetric traffic flow. The second local preference values for the remaining firewall pairs may also be generated based on the community value and policies stored therein to ensure the traffic flow is symmetric.

After the second local preference value is generated in block 912, the firewall pairs may send the second sub-network prefix and second local preference value to the PE router at the first site (block 914). The second local preference value may be sent in a BGP advertisement. In block 916, the firewall pairs may begin receiving one or more data packets from the PE routers at the first and second sites, and add labels to the one or more data packets and forward them to the P routers that may in turn route them to the corresponding PE routers. After the firewall pair begins exchanging packets between the PE routers, the method may end.

Figure 10:
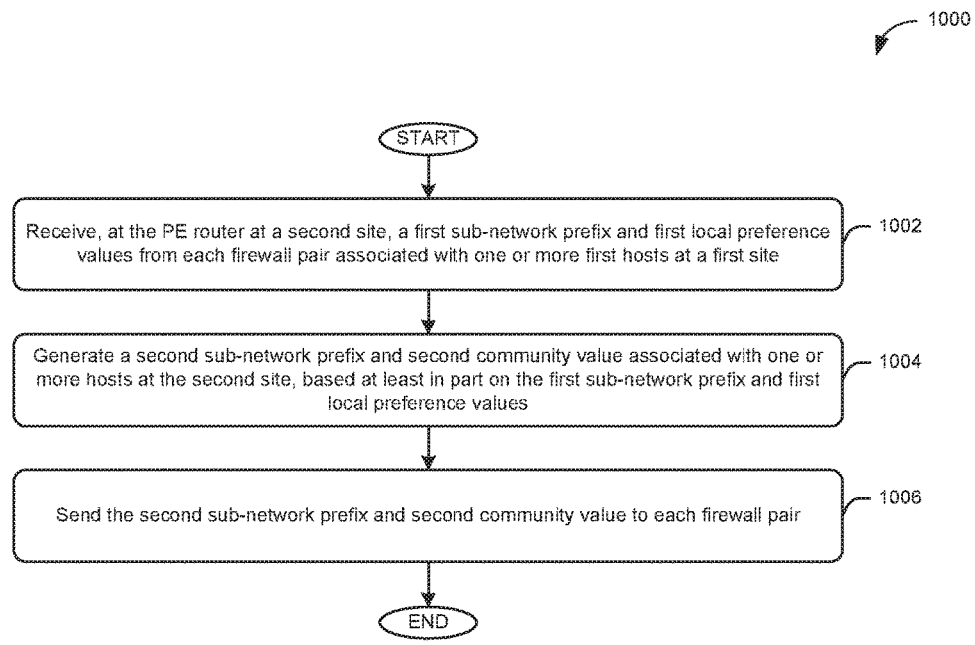
FIG. 10 is a flow diagram illustrating an example dataflow for establishing symmetric traffic between routers connecting one or more hosts on different networks through a firewall pair, in accordance with certain example embodiments of the disclosure.

FIG. 10 is a flow diagram illustrating an example dataflow for establishing symmetric traffic between routers connecting one or more hosts on different networks through a firewall pair. After initial start block, a PE router at a second site may receive a first sub-network prefix and first local preference values from each firewall pair associated with one or more first hosts at a first site in block 1002. The first local preference values may be received in a BGP advertisement. The PE router at the second site may perform block 1002 in response to the firewall pairs performing block 908. After block 1002, the PE router at the second site may use the first local preference value, as described above in FIG. 9, to generate a second sub-network prefix and second community value associated with one or more hosts at the second site, based at least in part on the first sub-network prefix and first local preference values in block 1004. At block 1006, the PE router may send the second sub-network prefix and second community value to each firewall pair. The second community value may be sent in a BGP advertisement. Block 1006 may cause each firewall pair to perform block 910 when the PE router at the second site sends the second sub-network prefix and second community value to each firewall pair. After the PE router at the second site sends the second sub-network prefix and second community value, the method may end.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various embodiments of the disclosure may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

We claim:

1. A firewall comprising:
   at least one memory for storing computer-executable instructions; and
   at least one processor configured to access the at least one memory, wherein the at least one processor is configured to execute the computer-executable instructions to:
      receive a request, in a first packet, from a first router to send at least one packet to two or more hosts at a second site,
      receive, from the first router, a first sub-network prefix, in a route advertisement, corresponding to the two or more hosts at a first site, and
      receive a first community value, in a first advertisement, associated with the first sub-network prefix;
      determine a first local preference value based at least in part on the first community value;
      send the request, first sub-network prefix, and first local preference value to a second router, in a second advertisement;
      receive a second community value from the second router, in a third advertisement, associated with a second sub-network prefix;
      generate a second local preference value based at least in part on the second community value and the first local preference value; and
      send the second local preference value to the first router in a fourth advertisement.

2. The firewall of claim 1, wherein the at least one processor is further configured to execute the computer-executable instructions to determine a route to the two or more hosts at the first site using the first sub-network prefix.

3. The firewall of claim 1, wherein the request from the first router is a request received from the two or more hosts, on a first network, connected to the first router.

4. The firewall of claim 1, wherein the request received from the first router comprises a second request received by the first router from the two or more hosts at a third site assigned to the first network requesting a route to the two or more hosts at the second site.

5. The firewall of claim 1, wherein the at least one processor is further configured to execute the computer-executable instructions to:
   receive a second sub-network prefix, in a second route advertisement, from the second router, wherein the second router is associated with the two or more hosts at the second site, and
   wherein the second sub-network prefix provides a route to the two or more hosts at the second site.

6. The firewall of claim 5, wherein the at least one processor is further configured to execute the computer-executable instructions to:
   send the second sub-network prefix to the first router, in a third route advertisement, in response to the request from the first router, wherein the second sub-network prefix provides a route to the hosts at the second site from the first router.

7. A non-transitory computer-readable medium storing computer-executable instructions stored therein, which when executed by at least one processor of a firewall, cause the at least one processor to perform the operation of:
   receiving a request, in a first packet, from a first router to send one or more packets to two or more hosts at the second site,
   receiving a first sub-network prefix, in a route advertisement, corresponding to two or more hosts at the first site from the first router, and
   receiving a first community value, in a first advertisement, associated with the first sub-network prefix;
   generating a first local preference value based at least in part on the first community value;
   sending the request, first sub-network prefix, and first local preference value to a second router, in a second advertisement;
   receiving a second community value from the second router associated with the second sub-network prefix in a third advertisement;
   generating a second local preference value based at least in part on the second community value and the first local preference value; and
   sending the second local preference value to the first router in a fourth advertisement.

8. The non-transitory computer-readable medium of claim 7, wherein the computer-executable instructions further cause the at least one processor to perform the operations of:
receiving a second sub-network prefix, in a second route advertisement, from the second router, wherein the second router is associated with the two or more hosts at the second site, and
wherein the second sub-network prefix provides a route to the two or more hosts at the second site; and
sending the second sub-network prefix to the first router.

9. The non-transitory computer-readable medium of claim 8, wherein the computer-executable instructions further cause the at least one processor to perform the operations of:
sending the second sub-network prefix to the first router, in a fifth route advertisement, wherein the second sub-network prefix provides a route to the two or more hosts at the second site from the first router.

10. The non-transitory computer-readable medium of claim 7, wherein the first sub-network prefix provides a route to the two or more hosts at the first site.

11. The non-transitory computer-readable medium of claim 7, wherein the first and second local preference values are numerical values.

12. The non-transitory computer-readable medium of claim 7, wherein the request from the first router is a request received from two or more hosts, on the first network, connected to the first router.

13. The non-transitory computer-readable medium of claim 7, wherein the request received from the first router comprises a second request received by the first router from hosts at a third site assigned to the first network requesting a route to the two or more hosts at the second site.

14. A method of routing packets between hosts at a first site and hosts at a second site in a network using a firewall, the method comprising:
receiving a request, in a first packet, from a first router to send one or more packets to two or more hosts at the second site,
receiving a first sub-network prefix, in a route advertisement, corresponding to two or more hosts at the first site from the first router, and
receiving a first community value, in a first advertisement, associated with the first sub-network prefix;
generating a first local preference value based at least in part on the first community value;
sending the request, first sub-network prefix, and first local preference value to a second router, in a second advertisement;
receiving a second community value from the second router associated with the second sub-network prefix in a third advertisement;
generating a second local preference value based at least in part on the second community value and the first local preference value; and
sending the second local preference value to the first router in a fourth advertisement.

15. The method of claim 14, further comprising:
receiving a second sub-network prefix, in a second route advertisement, from the second router, wherein the second router is associated with the two or more hosts at the second site, and
wherein the second sub-network prefix provides a route to the two or more hosts at the second site; and
sending the second sub-network prefix to the first router.

16. The method of claim 14, further comprising:
sending the second sub-network prefix to the first router, in a fifth route advertisement, wherein the second sub-network prefix provides a route to the two or more hosts at the second site from the first router.

17. The method of claim 14, wherein the request from the first router is a request received from two or more hosts, on the first network, connected to the first router.

18. The method of claim 14, the request received from the first router comprises a second request received by the first router from two or more hosts at a third site assigned to the first network requesting a route to the two or more hosts at the second site.

* * * * *